(12) United States Patent
Tanaka et al.

(10) Patent No.: US 9,193,348 B2
(45) Date of Patent: Nov. 24, 2015

(54) VEHICLE AND CONTROL METHOD FOR VEHICLE

(71) Applicants: Nobuyuki Tanaka, Toyota (JP); Masahiro Naito, Aichi-ken (JP)

(72) Inventors: Nobuyuki Tanaka, Toyota (JP); Masahiro Naito, Aichi-ken (JP)

(73) Assignees: Toyota Jidosha Kabushiki Kaisha, Toyota-shi (JP); Aisin Aw Co., Ltd., Anjo-shi (JP)

( * ) Notice: Subject to any disclaimer, the term of this patent is extended or adjusted under 35 U.S.C. 154(b) by 100 days.

(21) Appl. No.: 13/856,926

(22) Filed: Apr. 4, 2013

(65) Prior Publication Data

US 2013/0289814 A1    Oct. 31, 2013

(30) Foreign Application Priority Data

Apr. 25, 2012 (JP) ................. 2012-099583

(51) Int. Cl.
  *B60W 20/00* (2006.01)
  *B60K 6/445* (2007.10)
  *B60W 30/18* (2012.01)

(52) U.S. Cl.
  CPC ............... *B60W 20/00* (2013.01); *B60K 6/445* (2013.01); *B60W 30/18072* (2013.01); *B60W 2030/1809* (2013.01); *B60W 2540/10* (2013.01); *B60W 2710/105* (2013.01); *Y02T 10/6239* (2013.01); *Y10S 903/903* (2013.01)

(58) Field of Classification Search
  CPC ............... B60W 30/18072; B60W 30/1809; B60W 2710/00; B60W 2710/06; B60W 2710/08; B60W 2710/10

USPC .............................. 701/22, 54, 101, 112, 113
See application file for complete search history.

(56) References Cited

U.S. PATENT DOCUMENTS 4,192,279 A * 3/1980 Maisch et al. ............. 123/198 F
5,514,049 A * 5/1996 Kamio et al. ................. 477/111

(Continued)

FOREIGN PATENT DOCUMENTS

| JP | 2001-090830 A | 4/2001 |
| JP | 2001-191814 A | 7/2001 |

(Continued)

OTHER PUBLICATIONS

U.S. Office Action dated Oct. 27, 2014 issued to U.S. Appl. No. 13/856,939.

(Continued)

*Primary Examiner* — Thomas G Black
*Assistant Examiner* — Sara Nelson
(74) *Attorney, Agent, or Firm* — Dinsmore & Shohl LLP

(57) ABSTRACT

A vehicle includes a drive unit that generates a driving force for driving a driving wheel, and an accelerator pedal. In the vehicle, the driving force generated by the drive unit is controlled on the basis of an operation amount of the accelerator pedal, which is operated by a user. It is determined whether or not the vehicle carries out coasting with the drive unit unactivated. It is determined whether a predetermined condition that an activation command for the drive unit be received from the user with the accelerator pedal operated is fulfilled during the coasting. An actual driving force that is transmitted from the drive unit to the driving wheel is limited with respect to a driving force that is required by the user, in comparison with a case where the vehicle travels in a state other than the coasting, if the predetermined condition is fulfilled.

8 Claims, 4 Drawing Sheets

(56) References Cited

U.S. PATENT DOCUMENTS

| | | | |
|---|---|---|---|
| 8,548,642 B2* | 10/2013 | Handa | 701/1 |
| 8,591,381 B2* | 11/2013 | Zhang et al. | 477/150 |
| 8,712,672 B2* | 4/2014 | Hayashi et al. | 701/112 |
| 2003/0197385 A1* | 10/2003 | Onoyama et al. | 290/40 R |
| 2010/0006358 A1* | 1/2010 | Ishikawa | 180/65.265 |
| 2010/0030412 A1* | 2/2010 | Mitsutani | 701/22 |
| 2013/0109531 A1* | 5/2013 | Hoshiba | 477/52 |
| 2013/0179018 A1* | 7/2013 | Yamamoto et al. | 701/22 |
| 2013/0253806 A1* | 9/2013 | Ueno | 701/113 |
| 2013/0288857 A1* | 10/2013 | Tanaka et al. | 477/111 |
| 2013/0289814 A1 | 10/2013 | Tanaka et al. | |
| 2014/0107902 A1* | 4/2014 | Shiono | 701/99 |
| 2014/0277891 A1* | 9/2014 | Hoshiba | 701/22 |
| 2014/0277982 A1* | 9/2014 | Schenkermayr | 701/70 |

FOREIGN PATENT DOCUMENTS

| | | | |
|---|---|---|---|
| JP | 2002-364403 A | | 12/2002 |
| JP | 2004-092623 A | | 3/2004 |
| JP | 2004092623 A | * | 3/2004 |
| JP | 2008-179232 A | | 8/2008 |
| JP | 2008-232110 A | | 10/2008 |
| JP | 2010-018174 A | | 1/2010 |
| JP | 2011-111915 A | | 6/2011 |
| JP | 2011-183822 A | | 9/2011 |
| JP | 2011-239605 A | | 11/2011 |
| WO | 2013061452 A1 | | 5/2013 |

OTHER PUBLICATIONS

U.S. Office Action dated Apr. 24, 2015 issued to U.S. Appl. No. 13/856,939.

* cited by examiner

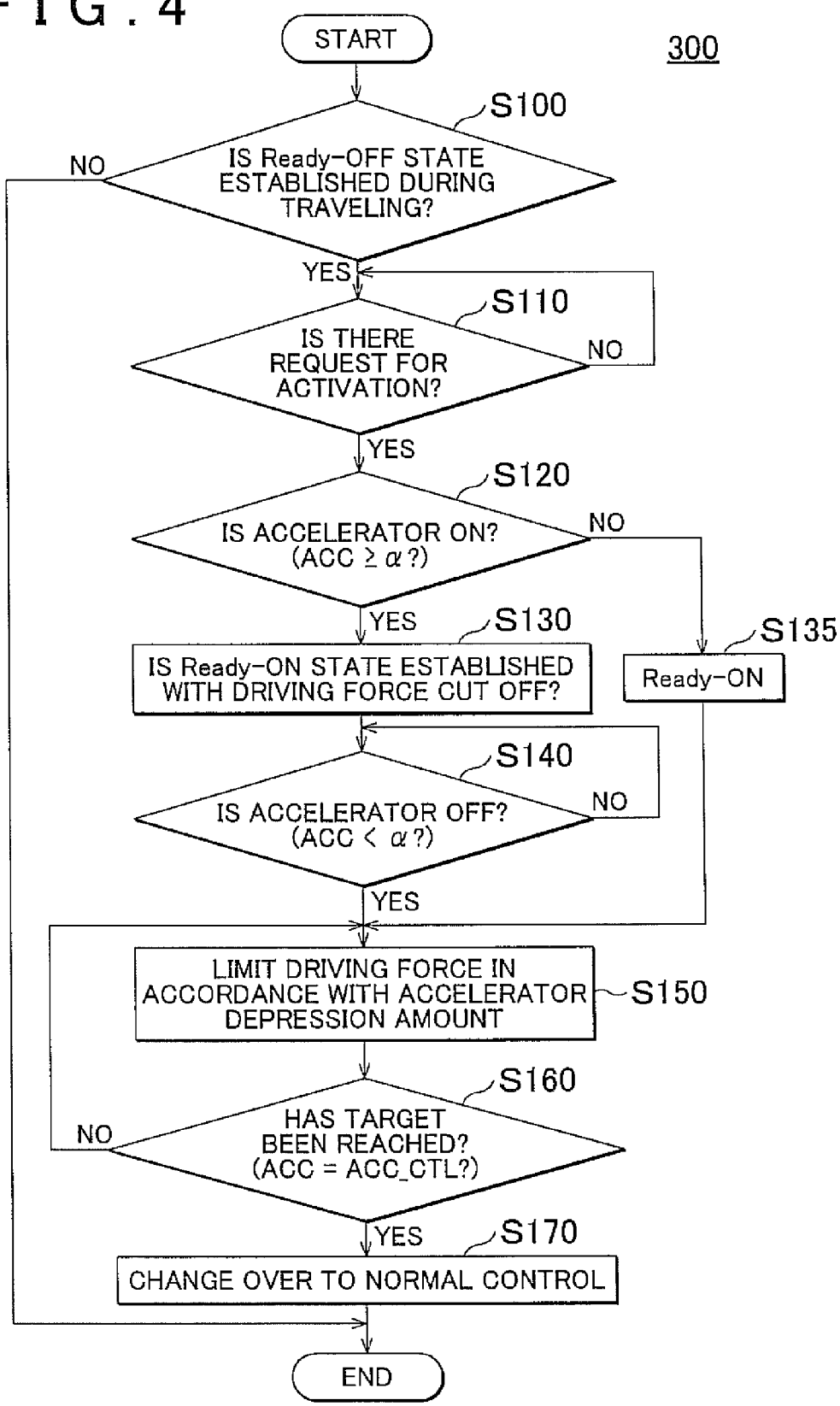

VEHICLE AND CONTROL METHOD FOR VEHICLE

INCORPORATION BY REFERENCE

The disclosure of Japanese Patent Application No. 2012-099583 filed on Apr. 25, 2012 including the specification, drawings and abstract is incorporated herein by reference in its entirety.

BACKGROUND OF THE INVENTION

1. Field of the Invention

The invention relates to a vehicle and a control method for the vehicle, and more specifically, to activation control of a vehicle in the case where a drive unit is activated during coasting.

2. Description of Related Art

In the case where a user erroneously turns off a power supply of a control system of a vehicle through operation during traveling of the vehicle, a drive unit including an internal combustion engine and a rotating electrical machine may be stopped, and the vehicle may coast with the generation of a driving force stopped.

In the case where the vehicle coasts in this manner, it may become necessary to reactivate the drive unit to cause the vehicle to travel appropriately.

Japanese Patent Application Publication No. 2004-092623 (JP-2004-092623 A) discloses an art of allowing an engine to be reactivated by temporarily changing over the shifting range to a neutral range through coercion or limiting the opening degree of a throttle even in the case where the range of an automatic transmission is set to a drive range, if the engine is stopped during traveling of a vehicle.

If the drive unit is reactivated during coasting as described above, the driving force from the drive unit suddenly recovers. In particular, if the drive unit is reactivated with an accelerator pedal operated by a user, the driving force rapidly recovers immediately after the activation of the drive unit.

SUMMARY OF THE INVENTION

The invention provides a vehicle and a control method for the vehicle that restrain the driving force of the vehicle from changing in the case where a drive unit is activated during coasting of the vehicle.

A first aspect of the invention relates to a vehicle. This vehicle is equipped with a drive unit configured to generate a driving force for driving a driving wheel, an accelerator pedal, and a controller configured to control the driving force generated by the drive unit on the basis of an operation amount of the accelerator pedal which is operated by a user, and to receive an activation command for the drive unit that is issued by the user. The controller being configured to limit an actual driving force that is transmitted from the drive unit to the driving wheel with respect to a driving force required by the user, in comparison with a case where the vehicle travels in a state other than coasting, if a condition i) that the vehicle carries out the coasting with the drive unit unactivated and a condition ii) that the controller receives the activation command for the drive unit with the accelerator pedal operated are fulfilled.

In the vehicle, the controller may be configured to activate the drive unit such that the actual driving force is not generated, if having received the activation command with the accelerator pedal operated.

In the vehicle, the controller may be configured to control the drive unit such that the actual driving force is not generated until operation of the accelerator pedal ceases, if having received the activation command with the accelerator pedal operated.

In the vehicle, the controller may be configured to control the drive unit such that a degree of an increase in the actual driving force with respect to an increase in an operation amount of the accelerator pedal becomes gentler than in a case where the vehicle travels in a state other than the coasting, if having received the activation command and after cessation of operation of the accelerator pedal.

In the vehicle, the controller may be configured to lift a limit imposed on the actual driving force after the actual driving force has reached a target driving force corresponding to an operation amount of the accelerator pedal.

In the vehicle, the controller may be configured to change the degree of the increase in the actual driving force on the basis of at least one of a magnitude of the operation amount of the accelerator pedal and an operation time of the accelerator pedal.

In the vehicle, the controller may be configured to limit a speed of the increase in the actual driving force to change the degree of the increase in the actual driving force.

In the vehicle, the controller may be configured to limit an upper-limit of the actual driving force to change the degree of the increase in the actual driving force.

In the vehicle, the drive unit may include at least one of an internal combustion engine and a rotating electrical machine.

A second aspect of the invention relates to a control method for a vehicle. This control method is designed for a vehicle including a drive unit configured to generate a driving force for driving a driving wheel, and an accelerator pedal. The control method includes controlling the driving force generated by the drive unit on the basis of an operation amount of the accelerator pedal which is operated by a user, determining whether the vehicle carries out coasting with the drive unit unactivated, determining whether a predetermined condition that an activation command for the drive unit is received from the user with the accelerator pedal operated is fulfilled during the coasting, and limiting an actual driving force that is transmitted from the drive unit to the driving wheel with respect to a driving force required by the user in comparison with a case where the vehicle travels in a state other than the coasting, if the predetermined condition is fulfilled.

According to the invention, the driving force of the vehicle can be restrained from changing if the drive unit is activated during coasting of the vehicle.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein:

FIG. 4 is a flowchart for illustrating the details of an activation control process that is performed by an ECU in this embodiment of the invention.

DETAILED DESCRIPTION OF EMBODIMENT

Figure 1:
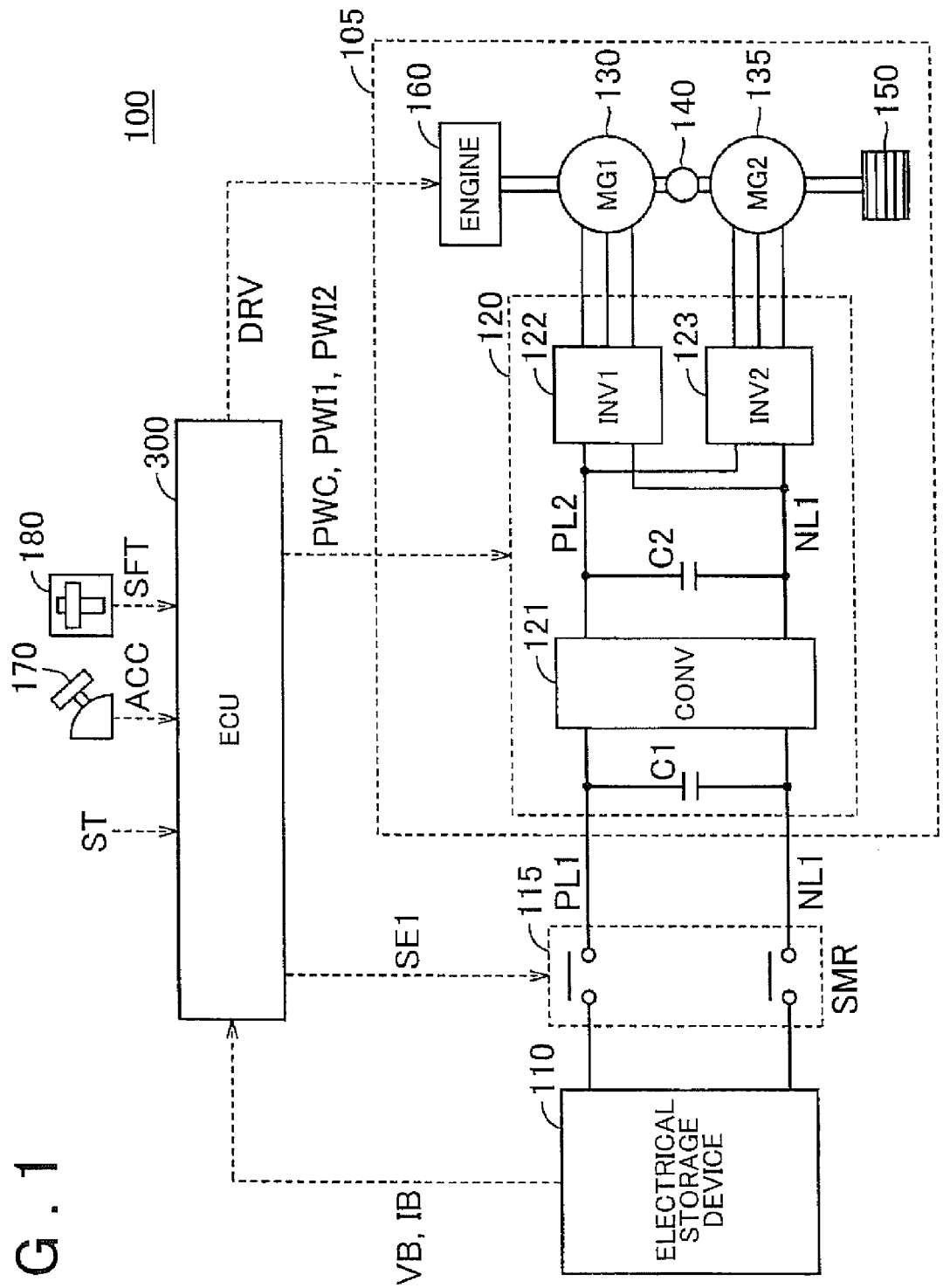
FIG. 1 is an overall block diagram of a vehicle according to this embodiment of the invention.

The embodiment of the invention will be described hereinafter in detail with reference to the drawings. Incidentally, identical or equivalent components in the drawings are denoted by the same reference symbols respectively, and the description thereof is not repeated.

FIG. 1 is an overall block diagram of a vehicle 100 according to this embodiment of the invention. Referring to FIG. 1, the vehicle 100 is equipped with a drive unit 105, an electrical storage device 110, a system main relay (an SMR) 115, an accelerator pedal 170, a shift lever 180, and an electronic control unit (an ECU) 300 as a controller. The drive unit 105 includes a power control unit (a PCU) 120, motor-generators 130 and 135, a motive power transmission gear 140, a driving wheel 150, and an engine 160 as an internal combustion engine. Besides, the PCU 120 includes a converter 121, inverters 122 and 123, and capacitors C1 and C2.

The electrical storage device 110 is configured as a chargeably/dischargeably electric power storage element. The electrical storage device 110 is configured to include, for example, a secondary battery such as a lithium-ion battery, a nickel hydride battery, a lead storage battery or the like, or an electrical storage element such as an electric double-layer capacitor or the like.

The electrical storage device 110 is connected to the PCU 120 via electric power lines PL1 and NL1. In addition, the electrical storage device 110 supplies the PCU 120 with an electric power for generating a driving force of the vehicle 100. Besides, the electrical storage device 110 stores an electric power generated by each of the motor-generators 130 and 135. The output of the electrical storage device 110 is, for example, about 200 V.

The SMR 115 includes a relay that is connected to the electric power line PL1 and a positive electrode terminal of the electrical storage device 110, and a relay that is connected to the electric power line NL1 and a negative electrode terminal of the electrical storage device 110. In addition, the SMR 115 makes a changeover between the supply and shut-off of electric power between the electrical storage device 110 and the PCU 120, on the basis of a control signal SE1 from the ECU 300.

The converter 121 carries out voltage conversion between the electric power lines PL1 and NL1 and electric power lines PL2 and NL1, on the basis of a control signal PWC from the ECU 300.

The inverters 122 and 123 are connected in parallel to the electric power lines PL2 and NL1. The inverters 122 and 123 convert a direct-current electric power supplied from the converter 121 into an alternating-current electric power on the basis of control signals PWI1 and PWI2 from the ECU 300 respectively, and drive the motor-generators 130 and 135 respectively.

The capacitor C1 is provided between the electric power lines PL1 and NL1, and reduces fluctuations in the voltage between the electric power lines PL1 and NL1. Besides, the capacitor C2 is provided between the electric power lines PL2 and NL1, and reduces fluctuations in the voltage between the electric power lines PL2 and NL1.

Each of the motor-generators 130 and 135 is an alternating-current rotating electrical machine, for example, a permanent magnet synchronous electric motor that is equipped with a rotor in which a permanent magnet is embedded.

An output torque of each of the motor-generators 130 and 135 is transmitted to the driving wheel 150 via the motive power transmission gear 140 to cause the vehicle 100 to travel. The motive power transmission gear 140 is configured to include a motive power split mechanism that is represented by a speed reducer or a planetary gear. During regenerative braking operation of the vehicle 100, each of the motor-generators 130 and 135 can generate an electric power due to a turning force of the driving wheel 150. Then, the generated electric power is converted into a charge electric power of the electrical storage device 110 by the PCU 120.

Besides, the motor-generators 130 and 135 are coupled to an engine 160 as well via the motive power transmission gear 140. The engine 160 is controlled by a control signal DRV from the ECU 300.

Then, the motor-generators 130 and 135 and the engine 160 are cooperatively operated by the ECU 300, and a required vehicle driving force is generated. Furthermore, each of the motor-generators 130 and 135 can generate an electric power through rotation of the engine 160 or rotation of the driving wheel 150, and can charge the electrical storage device 110 using this generated electric power. In the embodiment of the invention, the motor-generator 135 is exclusively used as an electric motor for driving the driving wheel 150, and the motor-generator 130 is exclusively used as a generator that is driven by the engine 160.

An output shaft of the motor-generator 130 (MG1) is coupled to a sun gear of a planetary gear (not shown) included in the motive power transmission gear 140. An output shaft of the motor-generator 135 (MG2) is coupled to a ring gear of the planetary gear via a speed reducer. Besides, an output shaft of the engine 160 is coupled to a planetary carrier of the planetary gear. By establishing this coupling state, the motive power transmission gear 140 functions as a continuously variable transmission as well. Incidentally, although not shown in FIG. 1, an additional transmission may be provided in the drive unit 105.

In FIG. 1, the configuration of a hybrid vehicle that is provided with two motor-generators is shown as an example, but the number of motor-generators should not be thus limited. The hybrid vehicle may have one motor-generator, or more than two motor-generators. Besides, this embodiment of the invention is also applicable to vehicles other than hybrid vehicles. The vehicle according to this embodiment of the invention may be an electric vehicle or a fuel-cell-powered vehicle that does not include an engine, or a conventional vehicle whose only drive source is an engine.

The accelerator pedal 170 is operated by a user, and an operation amount of the accelerator pedal 170 (hereinafter referred to also as "an accelerator opening degree") is output to the ECU 300. Basically, the ECU 300 controls the driving force generated by the drive unit 105, on the basis of the accelerator opening degree ACC.

A shift lever 180 is a component for allowing the user to set a shift range of the vehicle. The shift lever 180 outputs to the ECU 300 information on a shift position SFT that is set through the operation by the user. The ECU 300 sets a shift range corresponding to the shift position SFT from the shift lever 180.

Examples of the shift range include a B range, an S range, and a D range as drive ranges (traveling ranges), an R range as a reverse range, a P range as a parking range, an N range as a neutral range and the like. The combination of usable speed ratios differs depending on the selected drive range. Besides, specific speed ratios can be set in the S range. For example, in the case where six speed ratios are provided, six ranges S1 to S6 are set in such a manner as to correspond to the first to sixth speeds respectively.

In addition, the ECU 300 controls the motor-generators 130 and 135 and the engine 160 such that an appropriate speed ratio is obtained in each of the shift ranges, on the basis of a user required power based on an operation amount of the accelerator pedal 170, a vehicle speed, and the like.

The ECU 300 includes a central processing unit (a CPU), a storage unit, and input/output buffers although all these components are not shown in FIG. 1. Signals are input to the ECU 300 from respective sensors and the like. Also, the ECU 300 outputs control signals to respective components, and controls the vehicle 100 and the respective components. Incidentally, the control of these components is not absolutely required to be performed by software, but can also be performed by dedicated hardware (an electronic circuit).

The ECU 300 calculates a state of charge (an SOC) of the electrical storage device 110 on the basis of detection values of a voltage VB and a current IB from a voltage sensor (not shown) and a current sensor (not shown), which are installed in the electrical storage device 110.

The ECU 300 acquires an activation request signal ST for the drive unit 105 that is generated through the operation by the user. The ECU 300 activates the motor-generators 130 and 135 and the engine 160 on the basis of these pieces of information.

Incidentally, in the configuration shown in FIG. 1, a single control unit is provided as the ECU 300. However, for example, it is also appropriate to adopt a configuration in which control units such as a control unit for the PCU 120, a control unit for the electrical storage device 110 and the like are individually provided for respective functions or respective components to be controlled.

In such a vehicle, a stopped state of a vehicle system may be caused through erroneous operation of instruments for activating/stopping the vehicle system, such as an ignition key, a start switch and the like, by a user during the traveling of the vehicle.

In such a state, the drive unit may be stopped to establish a state where no driving force is output (a Ready-OFF state). For example, combustion in the engine is stopped, or a switching element of the inverter for driving the rotating electrical machine is stopped from being activated (shut down).

At this moment, a required driving force is not ensured. Therefore, the user may immediately reactivate the vehicle system and attempt to restore the vehicle system to a Ready-ON state.

Thus, in this embodiment of the invention, activation control is performed to limit the driving force that is transmitted from the drive unit to the driving wheel with respect to the user required driving force based on the operation of the accelerator pedal in comparison with a case other than a coasting state, until a predetermined requirement is fulfilled, in the case where the user reactivates the drive unit in the coasting state in the Ready-OFF state during the traveling of the vehicle. Thus, the driving force can be prevented from fluctuating at the time of restoration from the Ready-OFF state during the traveling of the vehicle.

Figure 2:
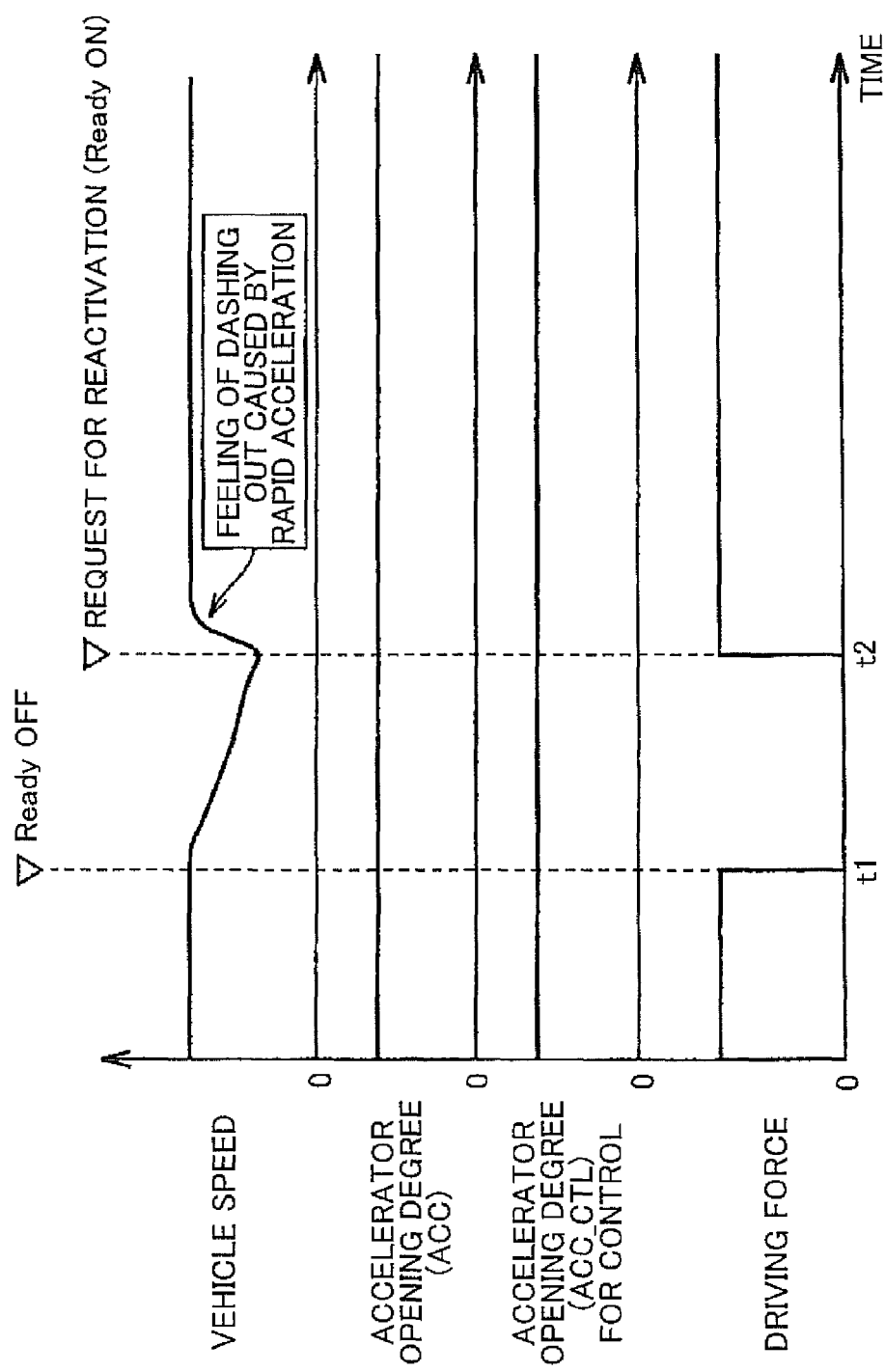
FIG. 2 is a time chart for illustrating the operation in the case of a comparative example in which activation control according to this embodiment of the invention is not applied.

Next, activation control according to this embodiment of the invention will be described using FIGS. 2 and 3. FIG. 2 is a time chart for illustrating the operation in the case of a comparative example in which activation control according to this embodiment of the invention is not applied. In FIG. 2, the axis of abscissa represents time, and the axis of ordinate represents vehicle speed, accelerator opening degree ACC, accelerator opening degree ACC_CTL for control, and actual driving force output from the drive unit. Incidentally, the accelerator opening degree ACC_CTL for control is an internal signal that is set on the basis of the accelerator opening degree ACC from the accelerator pedal 170 so as to be used by the ECU 300 for the control of the driving force. According to need, the ECU 300 corrects the accelerator opening degree ACC, and sets the accelerator opening degree ACC_CTL for control.

Referring to FIGS. 1 and 2, in this comparative example, the accelerator opening degree ACC set by the user is directly reflected by the accelerator opening degree ACC_CTL for control, which is used by the ECU 300 without modification.

In FIG. 2, until a time t1, it is assumed that the accelerator opening degree ACC is held constant, and that the vehicle travels at a substantially constant vehicle speed.

If the system is stopped to assume the Ready-OFF state through erroneous operation by the user or the like at the time t1, the drive unit 105 is in a stopped state, namely, an unactivated state. Therefore, no driving force is generated if the accelerator pedal 170 is operated. Thus, the vehicle coasts, and the vehicle speed gradually falls.

Then, if the user performs reactivation operation to establish the Ready-ON state at a time t2, the drive unit 105 is activated. At this time, if the accelerator opening degree ACC is still maintained, a drive command corresponding to the accelerator opening degree ACC is output from the ECU 300 to the drive unit 105 immediately after the activation of the drive unit 105. Thus, the driving force increases, and the vehicle is accelerated correspondingly.

On the other hand, the case where activation control according to this embodiment of the invention is applied will be described using a time chart of FIG. 3.

Figure 3:
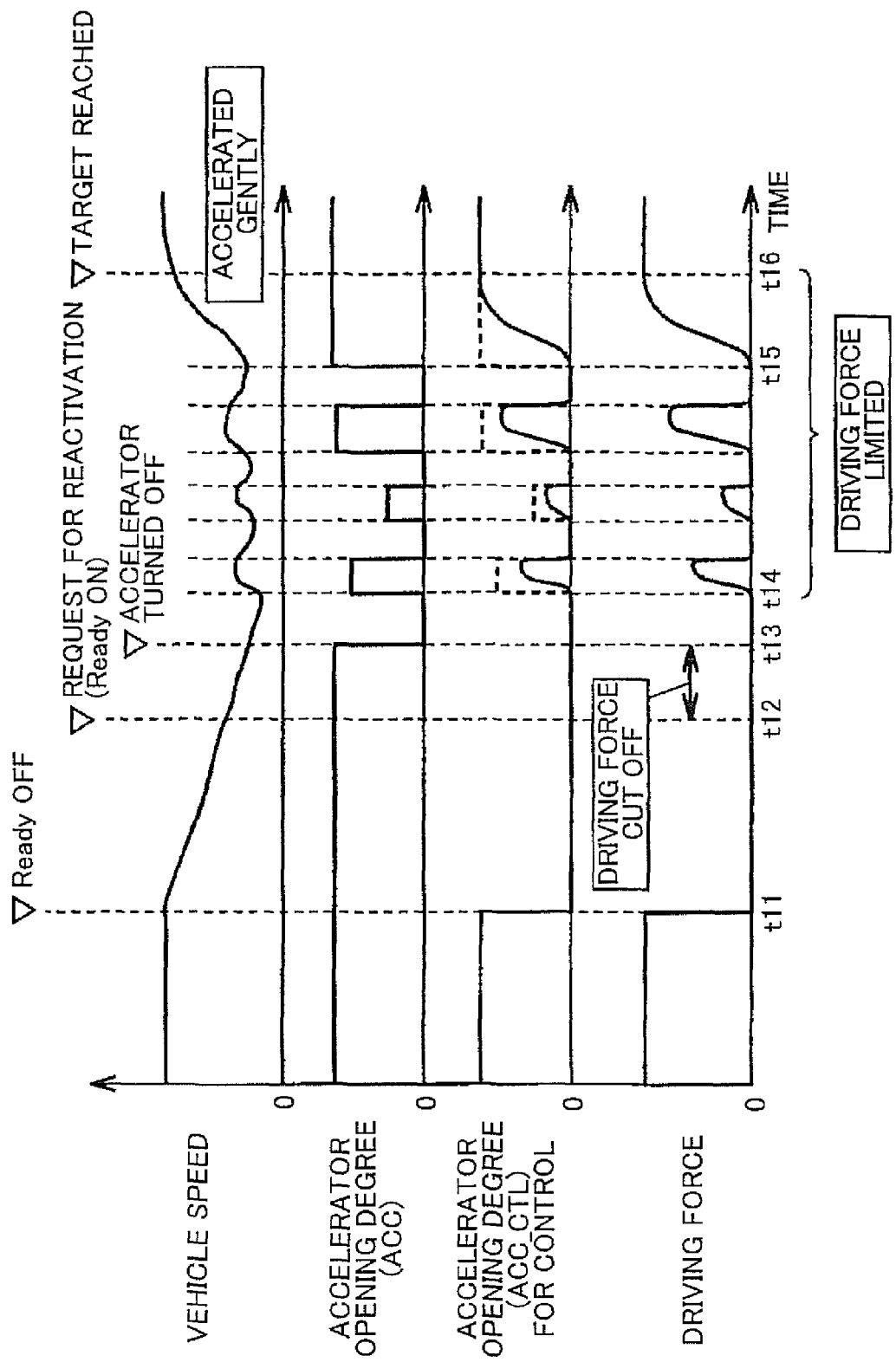
FIG. 3 is a time chart for illustrating the outline of activation control according to this embodiment of the invention.

Referring to FIG. 3, as is the case with FIG. 2, the accelerator opening degree ACC is held constant and the vehicle travels at a substantially constant vehicle speed until a time t11. If the Ready-OFF state is established at the time t11, the driving force is stopped from being output, and the vehicle speed gradually falls. At this moment, in activation control according to this embodiment of the invention, the accelerator opening degree ACC_CTL for control in the ECU 300 is set to zero regardless of the actual accelerator opening degree ACC.

Then, if the user performs reactivation operation with the accelerator opening degree ACC maintained at a time t12, the drive unit 105 is activated to establish the Ready-ON state, but the accelerator opening degree ACC_CTL for control is held at zero. Thus, a control signal for making the driving force equal to zero is output from the ECU 300 to the drive unit 105. Hence, no driving force is generated, and the vehicle speed also continues to fall.

Then, if the accelerator opening degree ACC temporarily becomes equal to zero to establish an accelerator-off state at a time t13, the accelerator opening degree ACC_CTL for control is thereafter changed as the user operates the accelerator pedal 170. However, at this moment, the accelerator opening degree ACC_CTL for control does not directly reflect the operation of the accelerator pedal 170 by the user as in normal cases, but is obtained by imposing a limit on the actual accelerator opening degree ACC. Incidentally, in the case where a certain limit is imposed on the operation of the accelerator pedal 170 during normal traveling as well, the degree of the limit is made even larger than in normal cases.

More specifically, the speed of change in the increase of the accelerator opening degree ACC_CTL for control is limited (a rate limit), and the accelerator opening degree ACC_CTL for control is made to more gently change with respect to the speed of change in the actual accelerator opening degree ACC than during normal traveling. Alternatively, the upper limit of the amount of change in the accelerator opening degree ACC_CTL for control may be limited. For example, the accelerator opening degree ACC_CTL for control may be set to 50% when the accelerator opening degree ACC is equal to 100%.

Incidentally, it is preferable to change the rate of this rate limit and the limit imposed on this upper-limit in accordance with the magnitude of the actual accelerator opening degree ACC and the duration time of accelerator operation. For example, the product: the accelerator opening degree×the operation duration time is used as a parameter, and the rate of the rate limit and the upper-limit are set in such a manner as to increase as this parameter increases.

In FIG. 3, the user repeatedly turns on/off the accelerator in a short period between a time t14 and a time t15, but the accelerator opening degree ACC_CTL for control more gently changes with respect to changes in the actual accelerator opening degree ACC than during normal traveling. As a result, the driving force that is output from the drive unit 105 also changes gently. Thus, the vehicle speed gradually increases.

Then, if the user continuously operates the accelerator from the time t15 and the accelerator opening degree ACC_CTL for control reaches the target accelerator opening degree ACC (at a time t16), the limit imposed on the accelerator opening degree ACC_CTL is thereafter lifted, and the accelerator opening degree ACC_CTL for control assumes a value that directly reflects the accelerator opening degree ACC. Thus, the response to the operation of the accelerator by the user recovers, and normal traveling is made possible.

As described hitherto, in activation control according to this embodiment of the invention, in the case the vehicle assumes a coasting state while traveling in the Ready-OFF state, even if a request for activation of the drive unit is made with the accelerator pedal on, the accelerator opening degree ACC_CTL for control is set to zero until the accelerator pedal is turned off. Then, even after the accelerator pedal is temporarily turned off, the accelerator opening degree ACC_CTL for control is limited with respect to the accelerator opening degree ACC in comparison with the case of normal traveling, until the accelerator opening degree ACC_CTL for control reaches the target accelerator opening degree ACC. Thus, in carrying out reactivation from the Ready-OFF state during the traveling of the vehicle, increase of the driving force through the operation of the accelerator by the user can be restrained.

If the Ready-OFF state is established during traveling, the response to the operation of the accelerator by the user is made gentle, whereby the user can be made to recognize that the vehicle is operable.

Incidentally, the foregoing description is given citing an exemplary case where the driving force is limited, namely, the input parameter is limited by limiting the accelerator opening degree ACC_CTL for control. However, the control in the ECU 300 is not limited to this case. For example, instead of changing the accelerator opening degree ACC_CTL for control, it is also appropriate to limit the required driving force (i.e., an output parameter) calculated by the ECU 300, and thereby limit the driving force that is eventually output.

FIG. 4 is a flowchart for illustrating an activation control process of the drive unit that is performed by the ECU 300 in this embodiment of the invention. In the flowchart shown in FIG. 4, a program stored in advance in the ECU 300 is called from a main routine and executed on a predetermined cycle, whereby the process is realized. Alternatively, the process in one of the steps or the processes in some or all the steps can also be realized by dedicated hardware (an electronic circuit).

Referring to FIGS. 1 and 4, the ECU 300 determines in step (which will be abbreviated hereinafter as S) 100 whether or not the vehicle 100 is in the Ready-OFF state during traveling, namely, whether or not the vehicle 100 coasts. More specifically, for example, if the vehicle speed is equal to or higher than a predetermined value with the motor-generators 130 and 135 and the engine 160 unactivated, it is determined that the vehicle 100 coasts.

If the vehicle 100 does not coast (NO in S100), the drive unit 105 has been activated, or the drive unit 105 has not been activated while the vehicle 100 is stopped. In this state, the activation of the drive unit 105 is unnecessary, or the drive unit 105 can be normally activated. Therefore, the ECU 300 skips the subsequent steps to end the process.

If the vehicle 100 coasts (YES in S100), the process is advanced to S110, and the ECU 300 determines whether or not an activation request has been received from the user.

If there is no activation request from the user (NO in S110), the process is returned to S100, and the ECU 300 awaits an activation request from the user. Incidentally, in the case where the user has stopped driving or the vehicle has been stopped for a certain length of period, there may not have been any activation request from the user for a long time. Hence, although not shown in FIG. 4, if there is no activation request from the user even after the lapse of a predetermined time that is set in advance, the process may be ended.

If there is an activation request from the user (YES in S110), the process is advanced to S120, and the ECU 300 determines whether or not the accelerator pedal 170 is on. It should be noted herein that the state where the accelerator pedal is on represents a state where the operation amount ACC of the accelerator pedal 170 is equal to or larger than an extremely small reference value a that is close to zero.

If the accelerator pedal 170 is not on, namely, off (NO in S120), no driving force is generated through normal activation. Therefore, the process is advanced to S135, and the ECU 300 activates the drive unit 105 without limiting the driving force, thereby establishing the Redy-ON state. After that, the process is advanced to S150.

On the other hand, if the accelerator pedal 170 is on (YES in S120), the driving force increases upon activation in this state. Therefore, the ECU 300 advances the process to S130, and activates the drive unit 105 to establish the Ready-ON state while imposing a limit such that no driving force is output (cutting off the driving force). That is, as described with reference to FIG. 3, the accelerator opening degree signal ACC_CTL for control, which is used to control the drive unit 105, is set to zero regardless of the actual operation amount ACC of the accelerator pedal 170.

Thus, the drive unit 105 is activated to become capable of outputting a driving force. However, at this stage, the driving force is limited as described above. Therefore, even if the accelerator is operated, no driving force is output from the drive unit 105.

After that, the ECU 300 advances the process to S140 to determine whether or not the accelerator pedal 170 has been returned to be turned off.

If the accelerator pedal 170 remains on (NO in S140), the process is returned to S140, and the ECU 300 continues to maintain the state where no driving force is output.

If the accelerator pedal 170 is turned off (YES in S140), the process is advanced to S150.

In response to the fulfillment of the conditions for the Ready-ON state and the accelerator off state, the ECU 300 ensures that a driving force is output from the drive unit 105 on the basis of the operation of the accelerator. However, in S150, the ECU 300 causes a driving force to be output while limiting the degree of increase in the driving force in accordance with the depression amount of the accelerator pedal 170, so as to prevent the driving force from rapidly increasing or decreasing through excessive accelerator operation by the user. That is, in this state, the ECU 300 causes the accelerator opening degree signal ACC_CTL for control to gradually approach the actual accelerator opening degree ACC.

More specifically, the rate of increasing the driving force is limited to a value lower than usual, or the upper-limit of the driving force that can be output is limited to a value lower than usual, with respect to the operation amount of the accelerator pedal 170, thereby limiting the degree of increase in the driving force to prevent the driving force from suddenly increasing. Incidentally, at this moment, the aforementioned rate of increasing the driving force or the aforementioned upper-limit may be gradually returned to a value during normal traveling, in accordance with the operation duration time of the accelerator pedal 170.

Then, the ECU 300 determines in S160 whether or not the accelerator opening degree signal ACC_CTL for control has reached the target accelerator opening degree and the actual driving force has reached the target driving force. That is, the ECU 300 determines whether or not the accelerator opening degree signal ACC_CTL for control has become approximately equal to the actual accelerator operation amount ACC.

If the accelerator opening degree signal ACC_CTL for control has not reached the target accelerator opening degree or the actual driving force has not reached the target driving force (NO in S160), the process is returned to S150, and the ECU 300 maintains a state where the driving force is limited with respect to the operation amount of the accelerator pedal 170, until the accelerator opening degree signal ACC_CTL becomes approximately equal to the actual accelerator operation amount ACC.

On the other hand, if the accelerator opening degree signal ACC_CTL for control has reached the target accelerator opening degree and the actual driving force has reached the target driving force (YES in S160), the process is advanced to S170, and the ECU 300 lifts the aforementioned limit imposed on the driving force, and controls the driving force such that the accelerator opening degree signal ACC_CTL directly reflects the accelerator opening degree ACC. Thus, a normal control state is restored.

Through the performance of the control according to the process as described above, if the operation of activating the drive unit is performed while the vehicle travels in a coasting state where the drive unit has not been activated, the driving force that is output in response to the accelerator operation is limited in comparison with the case of normal traveling. Therefore, the driving force is restrained from increasing.

The embodiment of the invention disclosed herein should be considered to be exemplary in all respects and not restrictive. The scope of the invention is not defined by the foregoing description but by the claims. The invention is intended to encompass all the alterations that are equivalent in significance and scope to the claims.

What is claimed is:

1. A vehicle comprising:
   a drive unit configured to generate a driving force for driving a driving wheel;
   an accelerator pedal; and
   a controller configured to control the driving force generated by the drive unit on a basis of an operation amount of the accelerator pedal which is operated by a user, and to receive an activation command for the drive unit that is issued by the user,
   the controller being configured to limit an actual driving force that is transmitted from the drive unit to the driving wheel with respect to a driving force required by the user, in comparison with a driving force when the vehicle travels in a state other than coasting, if a condition i) that the vehicle carries out the coasting with the drive unit unactivated and a condition ii) that the controller receives the activation command for the drive unit with the accelerator pedal operated are fulfilled,
   the controller being configured to activate the drive unit such that the actual driving force is not generated, if having received the activation command with the accelerator pedal operated,
   the controller being configured to control the drive unit such that the actual driving force is not generated until operation of the accelerator pedal ceases, if having received the activation command with the accelerator pedal operated.

2. The vehicle according to claim 1, wherein
   the drive unit includes at least one of an internal combustion engine and a rotating electrical machine.

3. The vehicle according to claim 1, wherein
   the controller is configured to control the drive unit such that a degree of an increase in the actual driving force with respect to an increase in an operation amount of the accelerator pedal becomes gentler than in a case where the vehicle travels in a state other than the coasting, if having received the activation command and after cessation of operation of the accelerator pedal.

4. The vehicle according to claim 3, wherein
   the controller is configured to limit an upper-limit of the actual driving force to change the degree of the increase in the actual driving force.

5. The vehicle according to claim 3, wherein
   the controller is configured to lift a limit imposed on the actual driving force after the actual driving force has reached a target driving force corresponding to an operation amount of the accelerator pedal.

6. The vehicle according to claim 3, wherein
   the controller is configured to change the degree of the increase in the actual driving force on the basis of at least one of a magnitude of the operation amount of the accelerator pedal and an operation time of the accelerator pedal.

7. The vehicle according to claim 3, wherein
   the controller is configured to limit a speed of the increase in the actual driving force to change the degree of the increase in the actual driving force.

8. A control method for a vehicle including a drive unit configured to generate a driving force for driving a driving wheel, and an accelerator pedal, the control method comprising:
   controlling the driving force generated by the drive unit on a basis of an operation amount of the accelerator pedal which is operated by a user;
   determining whether the vehicle carries out coasting with the drive unit unactivated;
   determining whether a predetermined condition that an activation command for the drive unit is received from the user with the accelerator pedal operated is fulfilled during the coasting; and
   limiting an actual driving force that is transmitted from the drive unit to the driving wheel with respect to a driving force required by the user, in comparison with a driving force when the vehicle travels in a state other than the coasting, if the predetermined condition is fulfilled;

activating the drive unit such that the actual driving force is not generated, if having received the activation command with the accelerator pedal operated; and controlling the drive unit such that the actual driving force is not generated until operation of the accelerator pedal ceases, if having received the activation command with the accelerator pedal operated.

* * * * *